United States Patent
Akenine-Moller et al.

(10) Patent No.: US 11,823,318 B2
(45) Date of Patent: Nov. 21, 2023

(54) TECHNIQUES FOR INTERLEAVING TEXTURES

(71) Applicant: NVIDIA CORPORATION, Santa Clara, CA (US)

(72) Inventors: Tomas Akenine-Moller, Lund (SE); Michael Fetterman, Lancaster, MA (US); Steven James Heinrich, Madison, AL (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/339,603

(22) Filed: Jun. 4, 2021

(65) Prior Publication Data

US 2022/0392140 A1 Dec. 8, 2022

(51) Int. Cl.
*G06T 15/04* (2011.01)
*G06T 15/00* (2011.01)
*G06T 15/06* (2011.01)

(52) U.S. Cl.
CPC ............ *G06T 15/04* (2013.01); *G06T 15/005* (2013.01); *G06T 15/06* (2013.01)

(58) Field of Classification Search
CPC ..... G06T 15/04; G06T 15/005; G06T 15/506; G06T 15/80; G06T 1/60; G06F 12/0607; G06F 12/0846; G09G 2360/123; G09G 2360/122
See application file for complete search history.

(56) References Cited

U.S. PATENT DOCUMENTS

| | | | |
|---|---|---|---|
| 6,313,846 B1 * | 11/2001 | Fenney | G06T 15/04 345/552 |
| 2004/0110559 A1 * | 6/2004 | Chosokabe | G06T 15/20 463/30 |
| 2007/0052713 A1 * | 3/2007 | Chung | G06T 15/04 345/501 |
| 2014/0098096 A1 * | 4/2014 | Bavoil | G06T 15/506 345/422 |
| 2019/0281307 A1 * | 9/2019 | King | G06T 9/004 |
| 2022/0180590 A1 * | 6/2022 | Seiler | G06T 1/60 |

* cited by examiner

*Primary Examiner* — Hau H Nguyen
(74) *Attorney, Agent, or Firm* — Artegis Law Group, LLP

(57) ABSTRACT

Techniques are disclosed herein for interleaving textures. In the disclosed techniques, multiple textures that would otherwise be accessed separately are interleaved into a single, interleaved texture that can be used to access the multiple textures together. The interleaved texture can include alternating blocks from the multiple textures. The interleaved texture can be generated when the multiple textures are being loaded into memory. Further, the interleaved texture can be accessed using multiple texture headers that are associated with different textures in the interleaved texture. Each of texture headers includes a stride indicating the distance between two blocks from a same texture in the interleaved texture.

17 Claims, 11 Drawing Sheets

TECHNIQUES FOR INTERLEAVING TEXTURES

BACKGROUND

Technical Field

Embodiments of the present disclosure relate generally to computer science and computer graphics and, more specifically, to techniques for interleaving textures.

Description of the Related Art

In three-dimensional (3D) computer graphics, ray tracing is a popular technique for rendering images, such as the frames of a movie or video game. Ray tracing techniques trace the path of light rays and simulate the effects of the light rays interacting with virtual objects within a virtual scene.

When a light ray being traced through a virtual scene intersects geometry representing a virtual object, one or more textures (also referred to as "texture maps") associated with that virtual object are sampled to obtain one or more texture values. The one or more texture values can, in turn, be used to determine the color of a pixel in a rendered image.

Oftentimes, a virtual object is associated with multiple textures, such as a base texture that indicates a color of the object, a specular texture that indicates a shininess of the object, and/or a normal map that indicates normals at a surface of the object. The multiple textures associated with a virtual object are typically stored and accessed separately during ray tracing. When a light ray being traced through a virtual scene intersects geometry representing such a virtual object, a separate cache line is allocated in a texture cache for each of the multiple textures. Texture data associated with those cache lines is then read from a memory and used to determine texture values. For example, one cache line could be allocated for a base texture, another cache line could be allocated for a specular texture, a further cache line could be allocated for a normal map, etc. and one or more sectors that include texture data could be read for each of the allocated cache lines.

One drawback of the above approach to ray tracing is that allocating a separate cache line for each texture associated with a virtual object and reading texture data associated with those cache lines can be wasteful when light rays being traced are relatively incoherent. When light rays being traced are coherent, the texture data that is read for each texture during the tracing of a particular light ray, and thereafter stored in the cache line allocated for that texture, can oftentimes be reused for neighboring light rays that travel in the same direction and intersect scene geometry at approximately the same location as the particular light ray. By contrast, incoherent light rays, such as those produced when light rays being traced through a scene are reflected after hitting scene geometry, typically travel in different directions and intersect different geometries within a virtual scene, or intersect the same geometry at different locations. Oftentimes, in such cases, the cache line that is allocated and the texture data that is read for each texture during the tracing of a particular light ray cannot be re-used for other light rays. Instead, additional cache lines must be allocated, and additional texture data read, for textures associated with virtual objects that are intersected by those other light rays. Accordingly, allocating a separate cache line for each texture associated with a virtual object and reading texture data associated with those cache lines can be computationally expensive and use a relatively large amount of texture bandwidth.

As the foregoing illustrates, what is needed in the art are more effective techniques for rendering graphics scenes using ray tracing.

SUMMARY

One embodiment of the present disclosure sets forth a computer-implemented method for rendering one or more graphics images. The method includes generating an interleaved texture based on a plurality of textures. The interleaved texture comprises texture data from the plurality of textures. The method further includes rendering one or more graphics images based on the interleaved texture.

At least one technological advantage of the disclosed techniques relative to the prior art is that, oftentimes, the disclosed techniques can allocate a single cache line for an interleaved texture and read associated texture data, rather than allocating a separate cache line for each of a number of textures, such as multiple textures associated with a virtual object that a light ray being traced through a virtual scene intersects, and reading texture data associated with those cache lines. Accordingly, texture bandwidth usage can be reduced, and computational performance can be improved. In addition, the disclosed techniques can be implemented with multiple texture headers that make the interleaved texture opaque to software applications and users. These technological advantages represent one or more technological improvements over prior art approaches.

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

BRIEF DESCRIPTION OF THE DRAWINGS

FIGS. 9A-C illustrate exemplar sectors and cache lines associated with interleaved textures, according to various embodiments;

DETAILED DESCRIPTION

Figure 1:
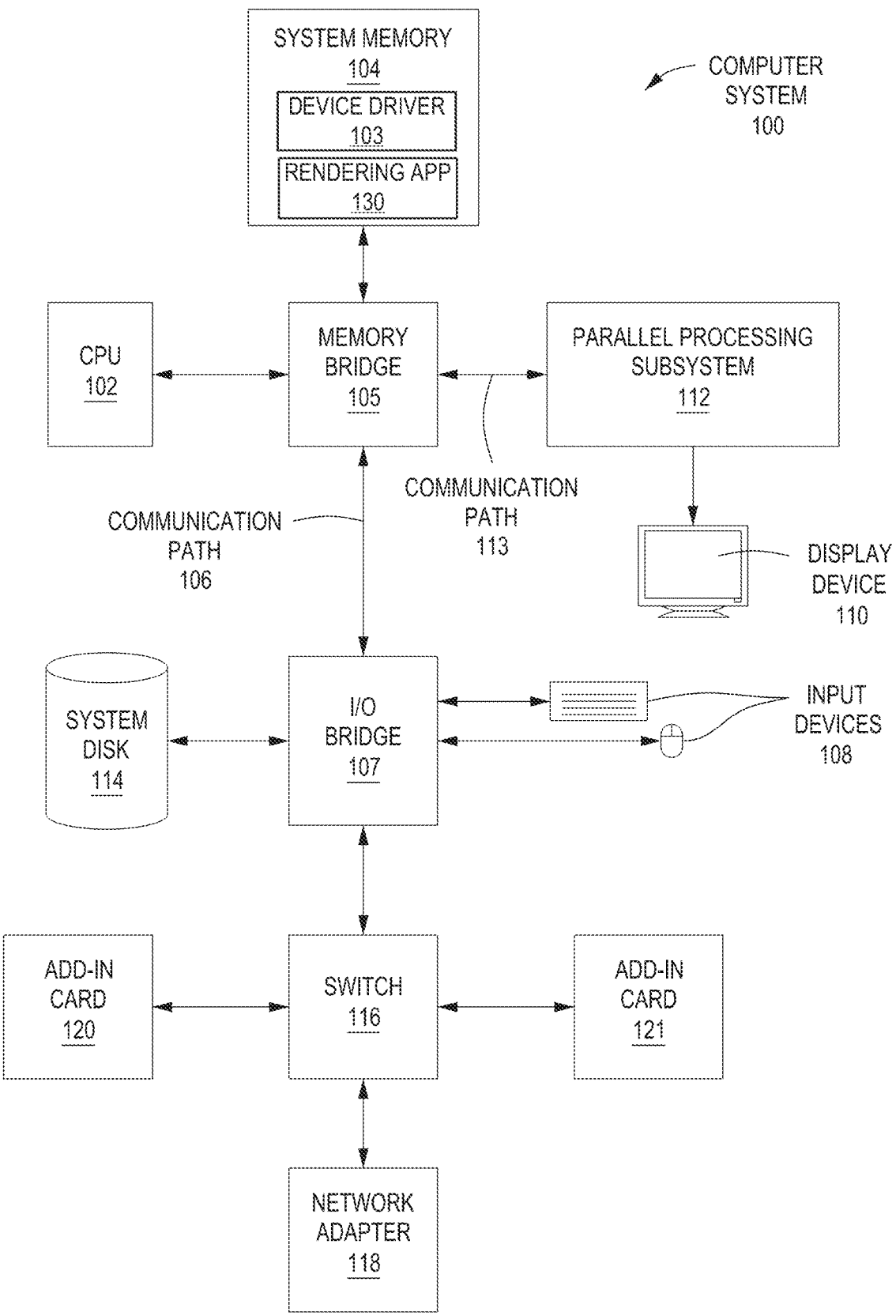
FIG. 1 is a block diagram illustrating a computer system configured to implement one or more aspects of the present embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for interleaving textures. The texture interleaving techniques have many real-world applications, including video games, film production rendering, and any other applications in which images or video frames can be rendered using textures. In the disclosed techniques, multiple textures that would otherwise be accessed separately are interleaved into a single, interleaved texture that can be used to access the multiple textures together. For workloads where identical coordinates are fetched from multiple textures, especially in incoherent patterns, fewer cache lines can be allocated within a cache, and less texture data can be read from memory, for the interleaved texture relative to the multiple textures. Use of the interleaved texture can improve computational performance and reduce texture bandwidth usage.

In some embodiments, an interleaved texture can include alternating blocks from multiple textures. Such an interleaved texture can be generated when the multiple textures are being loaded into memory. In some embodiments, the interleaved texture can be accessed using multiple texture headers that are associated with different textures in the interleaved texture. In such cases, each of the texture headers includes a stride indicating the distance between two blocks from a same texture in the interleaved texture. In other embodiments, the interleaved texture can be accessed using a single texture header.

The texture interleaving techniques of the present disclosure have many real-world applications. For example, the texture interleaving techniques can be used in ray tracing to efficiently render images and/or frames within a video game. As a particular example, the texture interleaving techniques could be performed by a cloud-based graphics processing platform, such as a cloud-based gaming platform, that executes video games and streams videos of game sessions to client devices. The disclosed texture interleaving techniques permit ray tracing to be performed in a more computationally efficient manner that uses less texture bandwidth than conventional ray tracing techniques, particularly when incoherent rays are being traced.

As another example, the texture interleaving techniques can be used in the production-quality rendering of films. The production of animated films as well as computer-generated imagery (CGI) and special effects within live action films, often requires high-quality rendering of frames of those films. The disclosed texture interleaving techniques can be used to render the frames of a film more efficiently than conventional ray tracing techniques, particularly when incoherent rays are traced.

The above examples are not in any way intended to be limiting. As persons skilled in the art will appreciate, as a general matter, the texture interleaving techniques described herein can be implemented in any application where conventional textures are currently employed, including but not limited to ray tracing techniques.

System Overview

FIG. 1 is a block diagram illustrating a computer system 100 configured to implement one or more aspects of the present embodiments. As persons skilled in the art will appreciate, computer system 100 can be any type of technically feasible computer system, including, without limitation, a server machine, a server platform, a desktop machine, laptop machine, a hand-held/mobile device, or a wearable device. In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112. In addition, the system memory 104 includes a rendering application 130 that communicates with one or more PPUs a device driver 103 that provides an interface to the PPU(s). The rendering application 130 can be any technically-feasible application that renders virtual 3D scenes using the interleaved textures disclosed herein. For example, the rendering application 130 could be a gaming application or a rendering application that is used in film production. Although described herein primarily with respect to the rendering application 130, techniques disclosed herein can also be implemented, either entirely or in part, in other software and/or hardware, such as in the parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in some embodiments. For example, the parallel processing subsystem 112 could be implemented as a virtual graphics processing unit (GPU) that renders graphics on a virtual machine (VM) executing on a server machine whose GPU and other physical resources are shared across multiple VMs.

Figure 2:
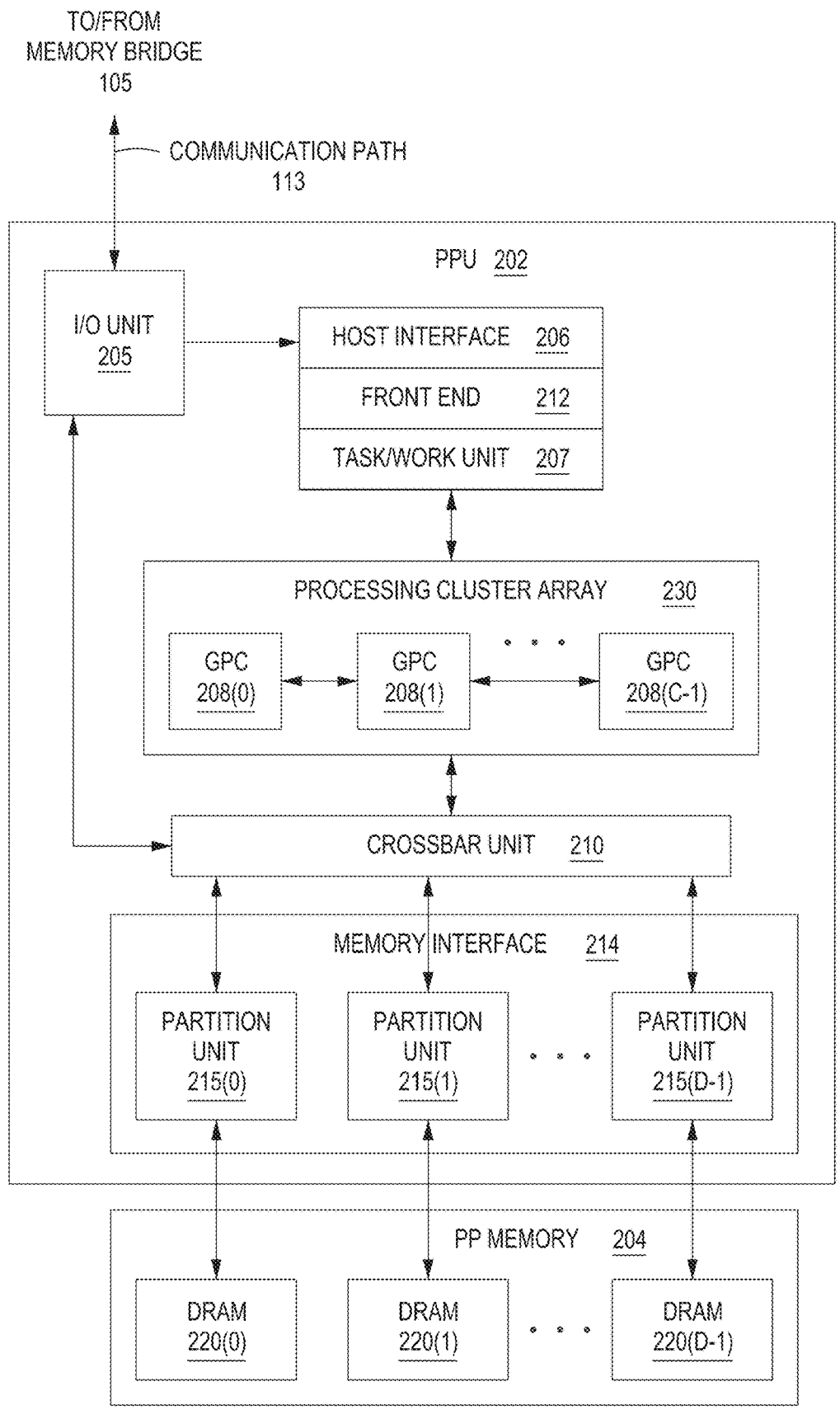
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a GPU that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also, for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, wearable devices, servers, workstations, game consoles, embedded systems, and the like.

Figure 3:
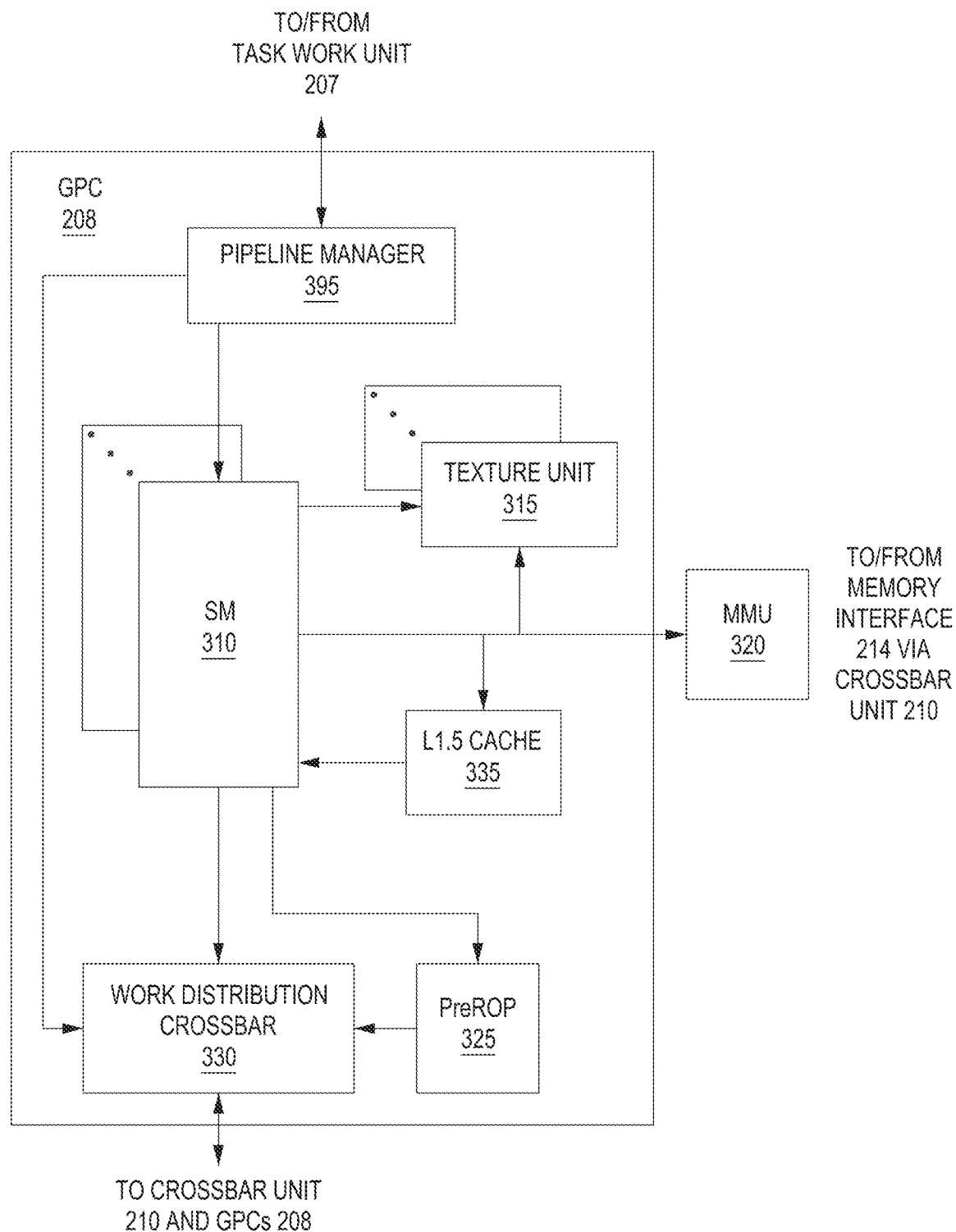
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 50R), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Figure 4:
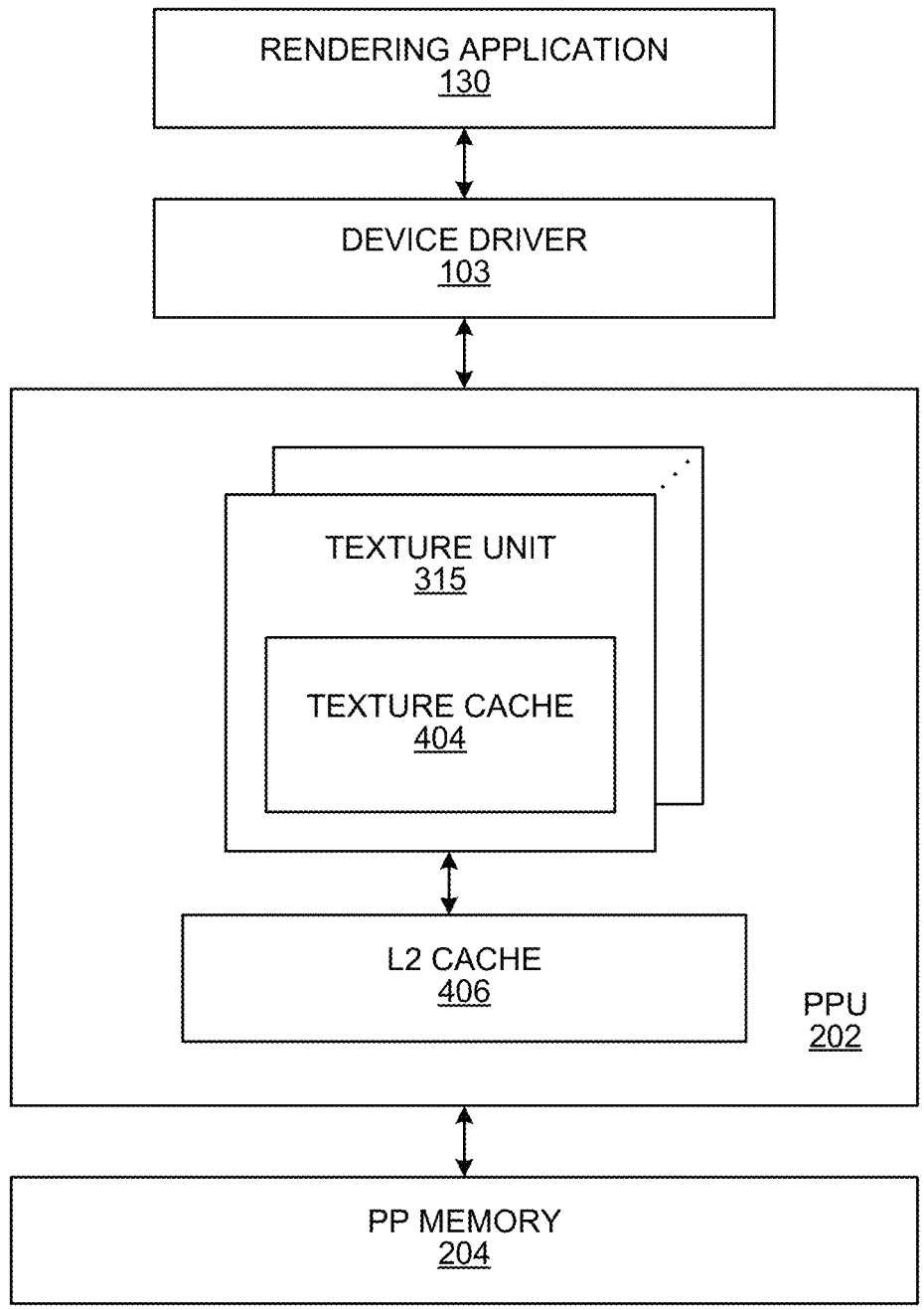
FIG. 4 is a block diagram illustrating the texture unit of FIG. 3 in greater detail, according to various embodiments.

FIG. 4 is a block diagram illustrating the texture unit 315 of FIG. 3 in greater detail, according to various embodiments. As described, the texture unit 315 performs texture mapping operations, such as determining texture sample positions, reading texture data, and filtering texture data. In some embodiments, the texture unit 315 includes one or more texture address units that map texels to pixels and that support various texture addressing modes. In addition, in some embodiments, the texture unit 315 can include texture filtering units that perform texture filtering.

As shown, the texture unit 315 includes a texture cache 404 that can store texture data read from the PP memory 204. In some embodiments, the texture unit 315 can read texture data of a fixed size from the PP memory 204 and store the texture data in a cache line that is allocated in the texture cache 404. For example, in some embodiments, the texture unit 315 may allocate a cache line that is 128 bytes (B) in size and read, from the PP memory 204, sectors of texture data that are each 32 B in size. In such cases, the texture unit 315 may only read those sectors that include texture data required for texture sampling that is being performed. As used herein, texture sampling can include retrieving texture data from one or more textures and/or performing texture filtering operations, such as bilinear lookups.

Although described herein primarily with respect to the texture cache 404, in some embodiments, textures can be accessed through a general, shared cache hierarchy. For example, instead of the texture cache 404, some embodiments may utilize a single cache that is distinct from the texture unit 315 and two separate address spaces (global memory vs "texture space") that compete for space in the cache.

Although described herein primarily with respect to reading from a memory such as the PP memory 204, embodiments may also implement caches other than the texture cache 404. Illustratively, the PPU 202 includes a level 2 (L2) cache 406 that can store texture data and/or other data read from the PP memory 204. Texture data that is cached in the L2 cache 406 can be read directly from the L2 cache 406, which is typically faster than reading from the PP memory 204.

During ray tracing, incoherent light rays may be traced through a virtual scene by the rendering application 130 that communicates with the PPU 202 via the device driver 103. As described, conventional ray tracing techniques require the texture unit 315 to (1) allocate a separate cache line within the texture cache 404 for each texture associated with a virtual object that a light ray intersects in a virtual scene, and (2) read texture data associated with those cache lines from memory. However, allocating a separate cache line for each texture and reading associated texture information can be computationally expensive and use a relatively large amount of texture bandwidth.

In some embodiments, interleaved textures are used to read multiple textures together, as described in detail below in conjunction with FIGS. 6-11. Fewer cache lines can be allocated within the texture cache 404, and less texture data can be read from memory, for an interleaved texture relative to multiple different textures, which can improve computational performance and reduce texture bandwidth usage. In some embodiments, an interleaved texture is generated by the device driver 103 when multiple textures that should be interleaved are being loaded into memory (e.g., the PP memory 204). In other embodiments, an interleaved texture can be generated in any technically feasible manner.

Figure 5:
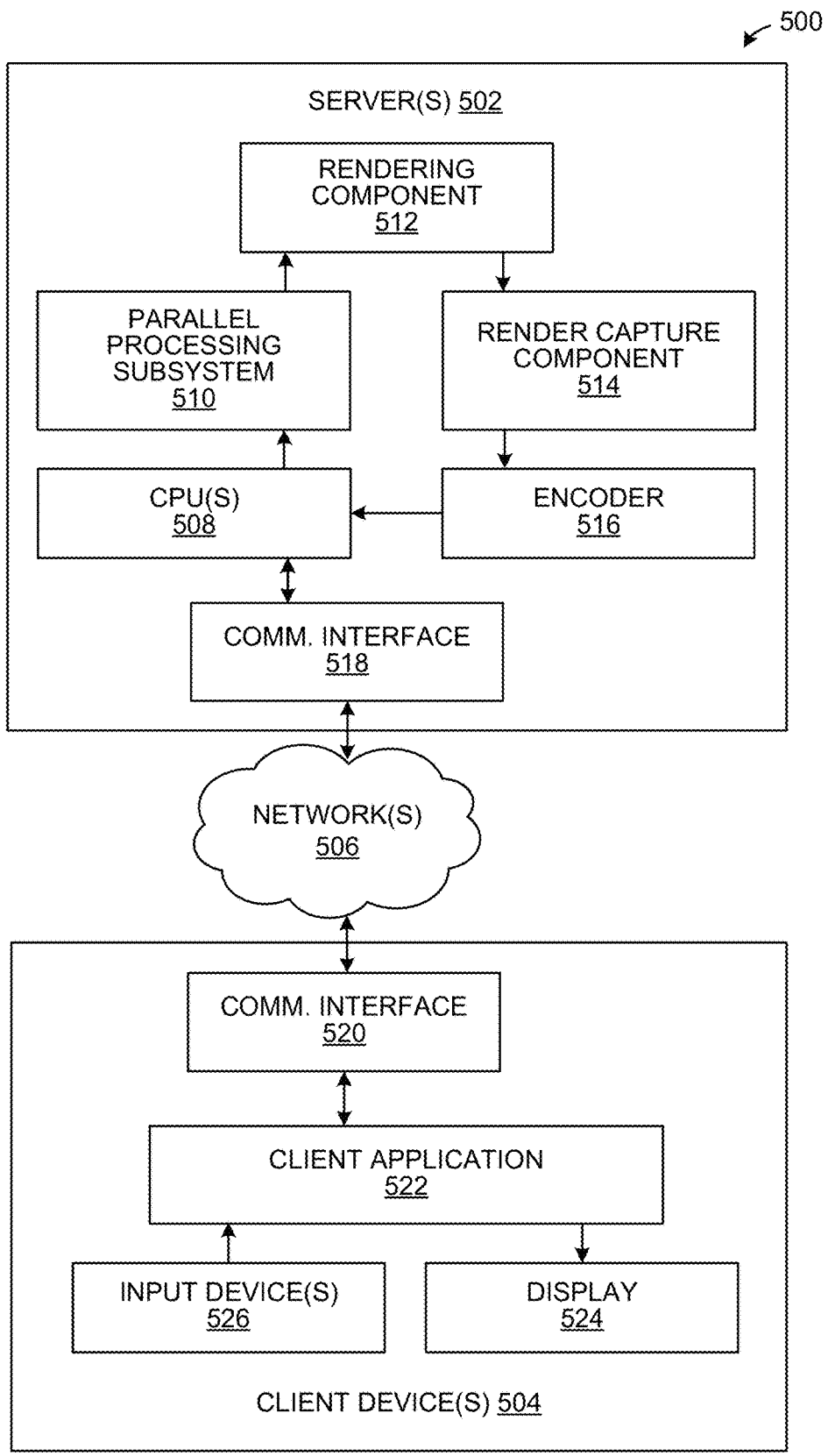
FIG. 5 is a block diagram illustrating an exemplar cloud computing system, according to various embodiments.

FIG. 5 is a block diagram illustrating an exemplar cloud computing system, according to various embodiments. As shown, a computing system 500 includes server(s) 502 that are in communication with client device(s) 504 via network (s) 506. Each of the server(s) 502 may include similar components, features, and/or functionality as the exemplar computer system 100, described above in conjunction with FIG. 1-4. Each of the server(s) 502 may be any technically feasible type of computer system, including, without limitation, a server machine or a server platform. Each of the client devices(s) 502 may also include similar components, features, and/or functionality as the computer system 100, except each client device 504 executes a client application 522 rather than the rendering application 130. Each of the client device(s) 504 may be any technically feasible type of computer system including, without limitation, a desktop machine, a laptop machine, a hand-held/mobile device, and/or a wearable device. In some embodiments, one or more of the server(s) 502 and/or the client device(s) 504 may be replaced with virtualized processing environment(s), such as virtualized processing environment(s) provided by one or more VMs and/or containers that execute on underlying hardware system(s). The network(s) 506 may include any type of network(s), such as one or more local area networks (LANs) and/or wide area networks (WANs) (e.g., the Internet).

In some embodiments, the server(s) 500 may be included in a cloud computing system, such as a public cloud, a private cloud, or a hybrid cloud, and/or in a distributed system. For example, the server(s) 500 could implement a cloud-based gaming platform that provides a game streaming service, also sometimes referred to as "cloud gaming," "gaming on demand," or "gaming-as-a-service." In such a case, games that are stored and executed on the server(s) 500 are streamed as videos to the client device(s) 504 via client application(s) 522 running thereon. During game sessions, the client application(s) 522 handle user inputs and transmit those inputs to the server(s) 500 for in-game execution. Although cloud-based gaming platforms are described herein as a reference example, persons skilled in the art will appreciate that, as a general matter, the server(s) 500 may execute any technically feasible types of application(s), such as design applications.

As shown, each of the client device(s) 504 includes input device(s) 526, the client application 522, a communication interface 520, and a display 524. The input device(s) 526 may include any type of device(s) for receiving user input, such as a keyboard, a mouse, a joystick, and/or a game controller. The client application 522 receives input data in response to user inputs at the input device(s) 526, transmits the input data to one of the server(s) 502 via the communication interface 520 (e.g., a network interface controller) and over the network(s) 506 (e.g., the Internet), receives encoded display data from the server 502, and decodes and causes the display data to be displayed on the display 524 (e.g., a cathode ray tube, liquid crystal display, light-emitting diode display, or the like). As such, more computationally intense computing and processing can be offloaded to the server(s) 502. For example, a game session could be streamed to the client device(s) 504 from the server(s) 502, thereby reducing the requirements of the client device(s) 504 for graphics processing and rendering.

As shown, each of the server(s) 502 includes a communication interface 518, CPU(s) 508, a parallel processing subsystem 510, a rendering component 512, a render capture component 514, and an encoder 516. Input data transmitted by the client device 504 to one of the server(s) 502 is received via the communication interface 518 (e.g., a network interface controller) and processed via the CPU(s) 508 and/or the parallel processing subsystem 510 included in that server 502, which correspond to the CPU 102 and the parallel processing subsystem 112, respectively, of the computer system 100 described above in conjunction with FIGS. 1-4. In some embodiments, the CPU(s) 508 may receive the input data, process the input data, and transmit data to the parallel processing subsystem 510. In turn, the parallel processing subsystem 510 renders one or more standalone images and/or image frames, such as the frames of a video game, based on the transmitted data.

Illustratively, the rendering component 512 employs the parallel processing subsystem 112 to render the result of processing the input data, and the render capture component 514 captures the rendering as display data (e.g., as image data capturing standalone image(s) and/or image frame(s)). The rendering performed by the rendering component 512 may include ray- or path-traced lighting and/or shadow effects, computed using one or more parallel processing units—such as GPUs, which may further employ the use of one or more dedicated hardware accelerators or processing cores to perform ray or path-tracing techniques—of the server 502. In some embodiments, the rendering component 512 performs rendering using the interleaved textures disclosed herein. Thereafter, the encoder 516 encodes display data capturing the rendering to generate encoded display data that is transmitted, over the network(s) 506 via the communication interface 518, to the client device(s) 504 for display to user(s). In some embodiments, the rendering component 512, the render capture component 514, and the encoder 516 may be included in the rendering application 130, described above in conjunction with FIG. 1.

Returning to the example of cloud gaming, during a game session, input data that is received by one of the server(s) 502 may be representative of movement of a character of the user in a game, firing a weapon, reloading, passing a ball, turning a vehicle, etc. In such a case, the rendering component 512 may generate a rendering of the game session that is representative of the result of the input data, and the render capture component 514 may capture the rendering of the game session as display data (e.g., as image data capturing rendered frames of the game session). Parallel processing (e.g., GPU) resources may be dedicated to each game session, or resource scheduling techniques may be employed to share parallel processing resources across multiple game sessions. In addition, the game session may be rendered using the interleaved techniques disclosed herein. The rendered game session may then be encoded, by the encoder 516, to generate encoded display data that is transmitted over the network(s) 506 to one of the client device(s) 504 for decoding and output via the display 524 of that client device 504.

It will be appreciated that the architecture described herein is illustrative and that variations and modifications are possible. Among other things, any number of processing units, such as the SMs 310, texture units 315, or preROP units 325, described above in conjunction with FIG. 3, may be included within GPC 208.

Interleaving Textures

Figure 6A:
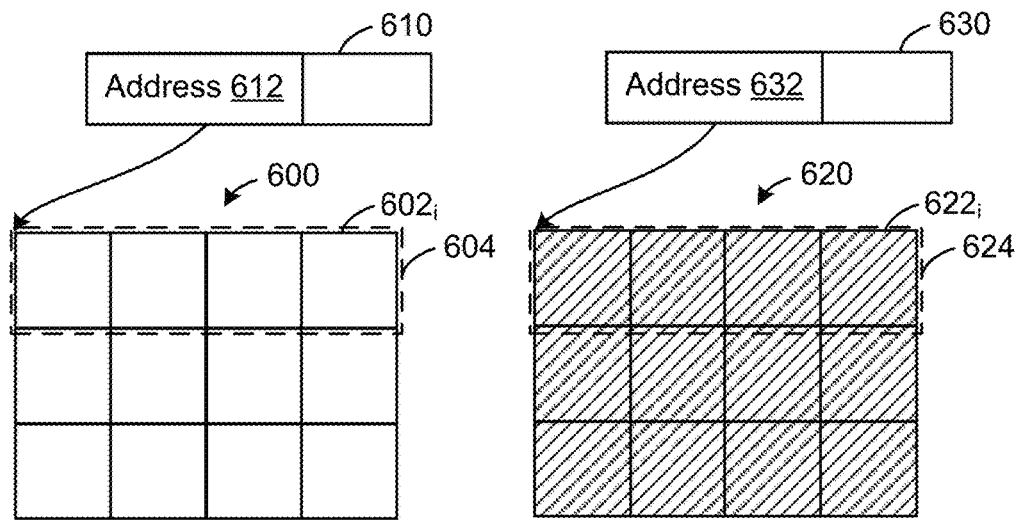
FIGS. 6A-6B illustrate an exemplar interleaving of textures and associated texture headers, according to various embodiments.
Figure 6B:
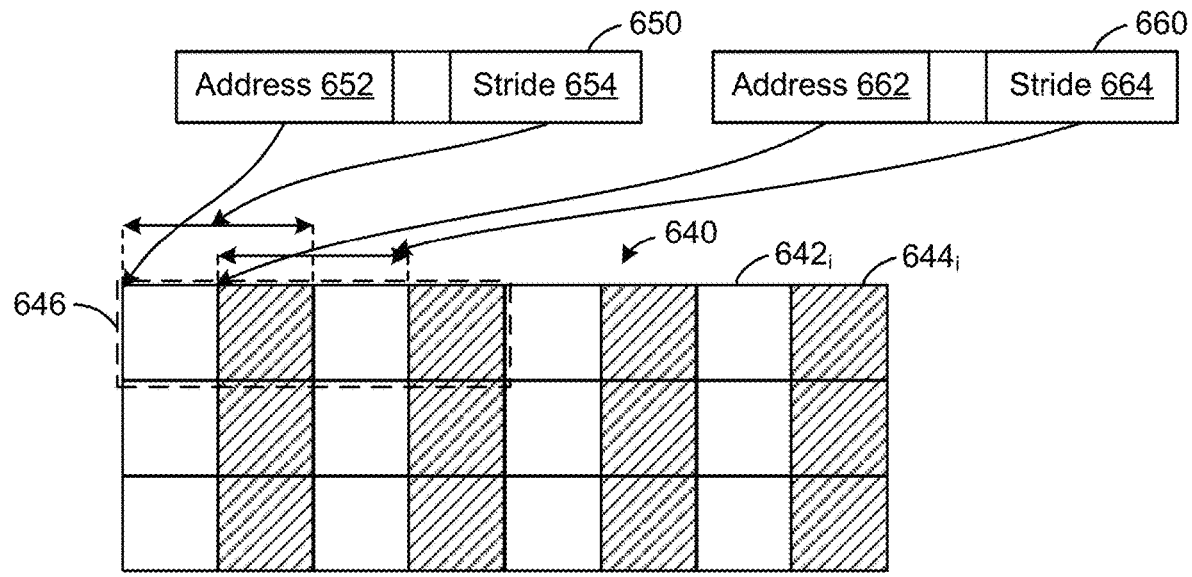

FIGS. 6A-6B illustrate an exemplar interleaving of textures and associated texture headers, according to various embodiments. FIG. 6A shows two exemplar textures 600 and 620 that are not interleaved. The textures 600 and 620 are different textures associated with a same virtual object. For example, each of the textures 600 and 620 could be a base texture that indicates a color of the object, a specular texture that indicates a shininess of the object, or a normal map that indicates normals at a surface of the object. In some embodiments, textures (e.g., the textures 600 and 620) can be non-compressed or compressed via any technically feasible compression formats. The following disclosure assumes that textures are compressed in blocks of 4×4 pixels, and that each block is stored using either 8 B or 16 B. For example, DirectX® supports the block compression (BCn) texture compression formats BC1-7. BC1 and BC4 store (compressed) texture data in 8 B blocks, whereas BC2, BC3, BC5, BC6H, and BC7 store (compressed) texture data in 16 B blocks.

As shown, the textures 600 and 620 can be accessed (e.g., from the PP memory 204 or the L2 cache 406) as blocks $602_i$ (referred to individually herein as a block 602 and collectively as blocks 602) and $622_i$ (referred to individually herein as a block 622 and collectively as blocks 622), respectively. Also shown are texture headers 610 and 630 that can be used to access the textures 600 and 620, respectively. Texture header 610 includes a starting address 612 that points to a block in the texture 600. Similarly, texture header 630 includes a starting address 632 that points to a block in the texture 620. In some embodiments, each texture header may also include other information, such as dimensions of a corresponding texture, a texture format, a resolution, etc. In addition, the size of a block in the textures 600 and 620 can be made explicit. For compressed textures, a compressed block size of the compressed textures may be used as a block size. For non-compressed textures, a block size may be, e.g., specified in a corresponding texture header or provided via a ruleset, such as a ruleset requiring blocks for non-compressed textures to have a particular size.

An application, such as the rendering application 130, can use texture headers to access particular textures, which can include using texture coordinates to sample the textures during rendering. However, the information included in texture headers, such as the addresses 612 and 632, may be opaque to applications in some embodiments.

As described, when tracing incoherent rays, conventional ray tracing techniques require (1) a cache line to be allocated within the texture cache 404 for each texture associated with a virtual object that a light ray intersects in a virtual scene, and (2) texture data associated with the cache line to be read from memory. Oftentimes, cache lines that are allocated, and texture data that is read, for a particular light ray cannot be reused for other light rays. Illustratively, the texture unit 315 can allocate a cache line 604 for the texture 600 and read texture data in four blocks 602 that are included in the cache line 604. In addition, the texture unit 315 can allocate another cache line 624 for the texture 620 and read texture data in four blocks 622 that are included in the cache line 624. Although described with respect to reading all blocks 602 and 622 included in the cache lines 602 and 624 as a reference example, in some cases, the texture unit 315 may only read sectors in a cache line that include texture data needed for texture sampling, as described below in conjunction with FIG. 9. The allocation of cache lines for each of the textures 600 and 620 and the reading of associated texture data can be computationally expensive and use a large amount of texture bandwidth. Further, compressing the textures 600 and 620 can only provide limited improvements to performance. A disadvantage with such an approach is that a full cache line (or at least a full sector) must be read into the cache line, even when only one or a few pixels are being accessed, such as when relatively incoherent rays are being traced.

FIG. 6B shows an exemplar interleaved texture 640 that can be generated from the textures 600 and 620. As shown, the interleaved texture 640 includes blocks $642_i$ (referred to individually herein as a block 642 and collectively as blocks 642) that alternate between blocks from the texture 600 and blocks from the texture 620. Additional interleaving formats that may be used in some embodiments are described in greater detail below in conjunction with FIG. 8. Textures that are interleaved can either be non-compressed, or compressed using the same or different compression formats. Returning to the example of DirectX, BC1-BC3 and BC7 can include either unsigned normal integer (unorm) or unorm and standard red, green, blue (sRGB) values, and BC6H can include either UF_16 (unsigned fp16 float) or SF-F16 (signed fp16 float) values. Examples of compression formats that can be interleaved include BC1_unorm (8 B) with BC1_unorm_srgb (8 B), BC2_unorm (16 B) with one BC1_unorm (8 B) and a BC4_snorm (8 B), etc.

An interleaved texture, such as the interleaved texture 640, can either be generated offline or at runtime by any technically feasible software and/or hardware. In some embodiments, a device driver (e.g., the device driver 103) associated with a parallel processing unit profiles an application at runtime by analyzing code of the application to determine whether interleaving textures can improve performance of the application, as described in detail below in conjunction with FIG. 10. In such cases, the device driver can interleave textures associated with one or more virtual objects in a virtual scene when the device driver determines that (1) interleaving the textures can improve performance, and (2) the textures have compatible formats and sizes for interleaving. In some embodiments, the device driver recognizes candidate textures as having compatible formats and dimensions for interleaving when multiple textures are associated with a same virtual object. Although described herein primarily with respect to interleaving multiple textures associated with a same virtual object, textures that are not associated with the same virtual object may also be interleaved in some embodiments. For example, textures having the same sizes (e.g., number of rows, columns, mip levels, etc.) and compatible formats, but associated with different virtual objects, could be interleaved.

In other embodiments, an application may be profiled offline, and interleaved textures may be generated prior to runtime based on the profiling. In further embodiments, the rendering application 130, or a user, may specify that particular textures are to be interleaved via, e.g., an application programming interface (API).

As shown, texture headers 650 and 660 can be used to access the different textures 600 and 620, respectively, in the interleaved texture 640. Each texture header 650 and 660 includes a starting address 652 and 662, respectively, that points to the first block of a corresponding texture in the interleaved texture 640. Each texture header 650 and 660 further includes a stride 654 and 664, respectively, that indicates a distance in bytes between two blocks from the same texture. The stride can be set to any technically feasible value, such as 8, 16, 32, or 64. In some embodiments, only a stride may be included in texture headers, and the starting addresses, described above, can be combined into a base address. To be able to encode strides of 8, 16, 32, and 64, only two extra bits are required, as there are only four different strides. For example, 00 could indicate a stride of 8, 01 could indicate a stride of 16, etc. Returning to the example of 8 B blocks, the texture headers 650 and 660 could include a stride of 8 that is encoded using two bits. In some embodiments, the strides 654 and 664 may be opaque to applications and users, who are not aware of the interleaved texture 640. In such cases, the applications may access the interleaved texture 640 using the texture headers 610 and 630 in the same manner as the applications would access the individual textures 600 and 620.

In some embodiments, the texture headers 650 and 660 can also include other information, such as information specifying a resolution, dimensions of the interleaved texture 650, a compression format, etc. In addition, the size of a block in the interleaved texture 640 should be made explicit. For an interleaving of compressed textures, a compressed block size of the compressed textures may be used as a block size of the interleaved texture. For an interleaving of non-compressed textures, a block size of the interleaved texture may be, e.g., specified in corresponding texture header(s) or provided via a ruleset, such as a ruleset requiring blocks for non-compressed interleaved textures to have a particular size.

Using the starting addresses 652 and 662, the strides 654 and 664, and texture coordinates provided by the rendering application 130, a texture unit (e.g., the texture unit 315) in a parallel processing unit can determine memory addresses to access for the different textures 600 and 620 in the interleaved texture 640. In other embodiments, a single texture header, such as a texture header that encodes multiple compression formats, may be used to access an interleaved texture. In such cases, applications and/or users may need to keep track of whether textures are interleaved or not, as well as which textures in an interleaved texture to access.

In contrast to the allocation of different cache lines within the texture cache 404 for each of the textures 600 and 620 and the reading of associated texture data from memory, described above in conjunction with FIG. 6A, the texture unit 315 can allocate a single cache line 646 for the interleaved texture 640 within the texture cache 404 and read texture data associated with the cache line 646 from memory. As shown, the cache line 646 that is read includes blocks from both of the textures 600 and 620. Accordingly, texture data that is read for the cache line 646 can be used to sample both of the textures 600 and 620. Although described with respect to reading the entire cache line 646 as a reference example, in some cases, the texture unit 315 may only read sectors in the cache line 646 that include texture data required for texture sampling, as described below in conjunction with FIG. 9. Because only a single cache line is allocated and only texture data associated with that cache line is read from memory, texture bandwidth usage can be reduced by 50% relative to allocating two cache lines and reading texture data associated with those cache lines. When an interleaved texture includes texture data from more than two textures, the texture bandwidth usage can be reduced even further. For example, when the interleaved texture includes texture data from four textures, the texture bandwidth usage can be reduced by 75%. In some cases, such as when a bilinear lookup of 2×2 pixels is being performed that requires texture data from multiple blocks that are in different cache lines, more than a single cache line may be allocated and texture data associated with the allocated cache lines read, even when interleaved textures are used.

Figure 7A:
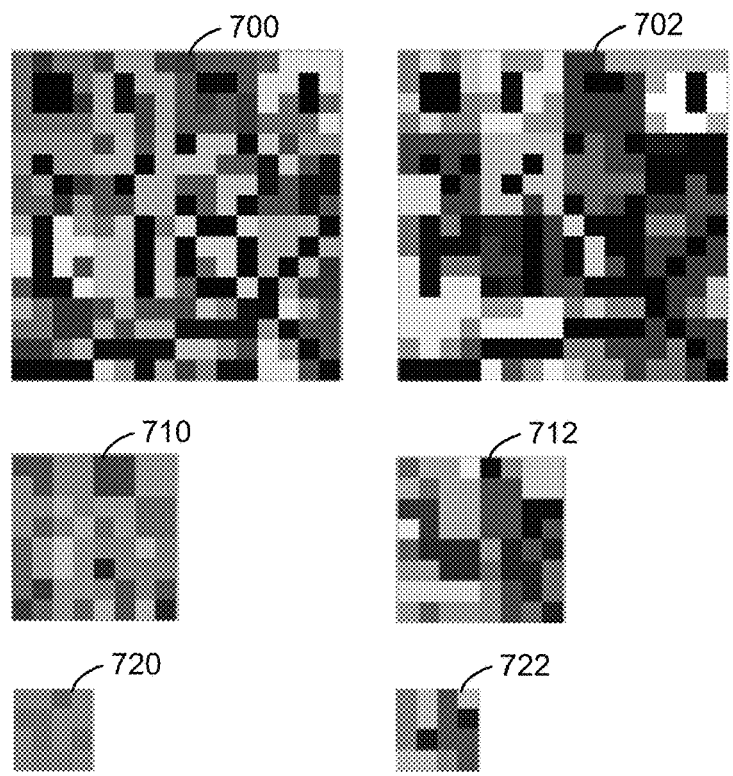
FIGS. 7A-7B illustrate an exemplar interleaving of textures and associated mipmap levels, according to various embodiments.
Figure 7B:
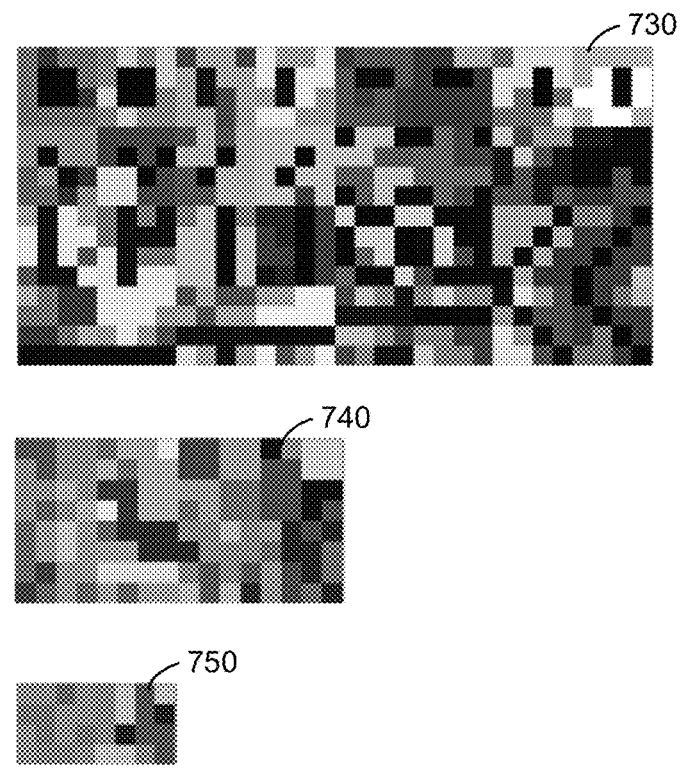

FIGS. 7A-7B illustrate an exemplar interleaving of textures and associated mipmap levels, according to various embodiments. FIG. 7A shows two exemplar 16×16 pixel textures 700 and 702. As shown, the textures 700 and 702 can be stored as 4×4 compressed blocks, each of which includes 4×4 pixels.

Each of the textures 700 and 702 can be used as a mipmap level 0, i.e., the base level of a mipmap. As shown, in some embodiments, a mipmap level 0 texture 700 is lowpass filtered and downsampled to generate mipmap level 1 710, which is in turn lowpass filtered and downsampled to generate mipmap level 2 720. Similarly, for the texture 702, a mipmap level 0 texture 702 is lowpass filtered and downsampled to generate mipmap level 1 712, which is in turn lowpass filtered and downsampled to generate mipmap level 2 722. In other embodiments, mipmap hierarchies may be created by other means than lowpass filtering and downsampling. For example, each image in a mipmap hierarchy could be painted by hand. Mipmaps of different levels can be used for anti-aliasing texture filtering.

FIG. 7B shows an exemplar interleaved texture 730 that is twice as wide as each of the textures 700 and 702. As shown, alternating blocks in the interleaved texture 730 are from the texture 700 and the texture 702. The interleaved texture 730 cannot be lowpass filtered and downsampled for use as mipmap level 1 710, because doing so would mix texture data from the textures 700 and 702, which may reduce compression quality. In some embodiments, each of the textures 700 and 702, and their mip map levels 710, 720, 712, and 722, are compressed separately. Then, the compressed textures are interleaved together to generate mipmap level 1 740 and mipmap level 2 750.

Figure 8:
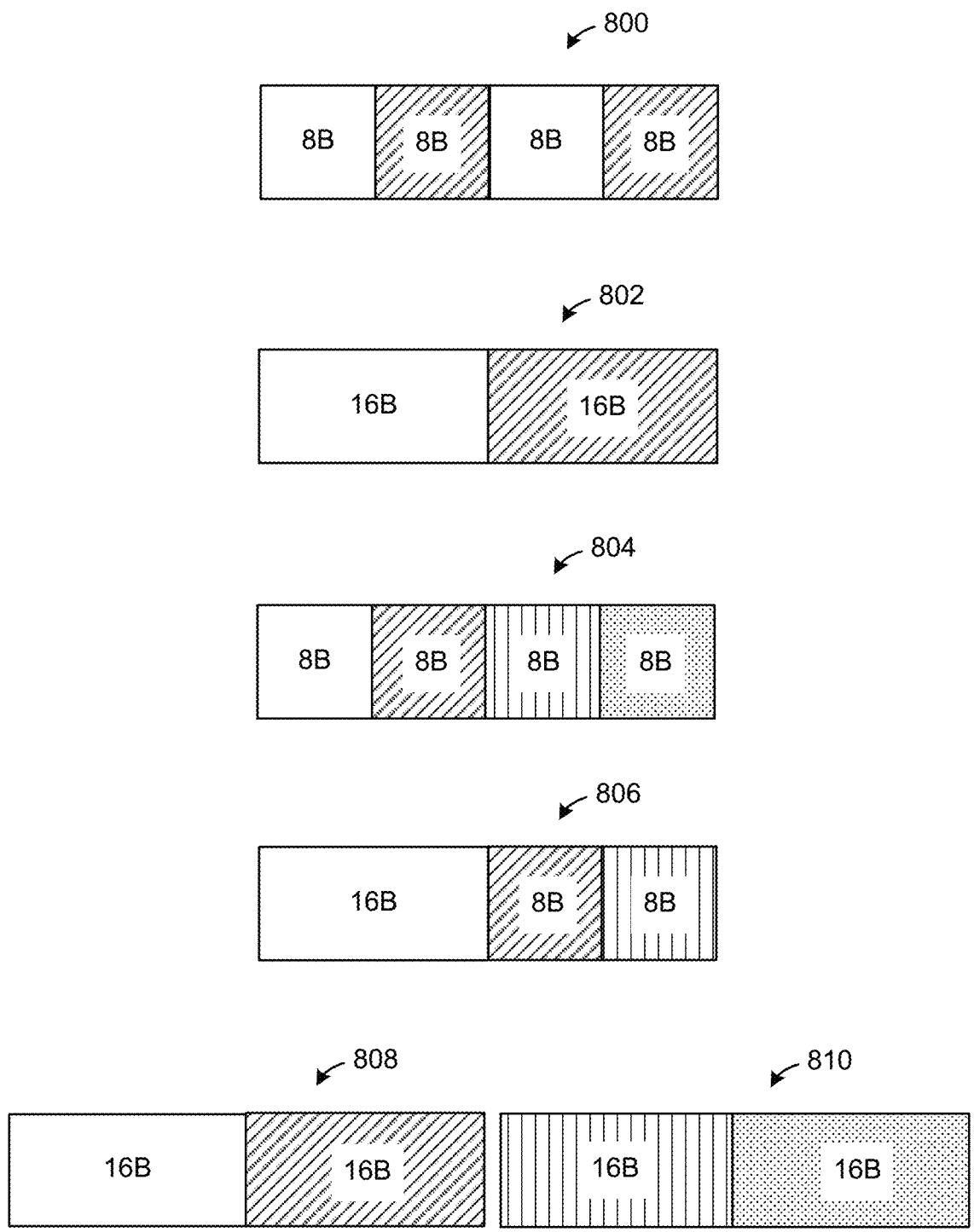
FIG. 8 illustrates exemplar formats for interleaving textures, according to various embodiments.

FIG. 8 illustrates exemplar formats for interleaving textures, according to various embodiments. Assume that each cache line is 32B in size. As shown, a 32 B cache line 800 for a texture that is generated by interleaving two textures can include alternating 8 B blocks from each of the two textures. Alternatively, a 32 B cache line 802 for a texture that is generated by interleaving two textures can include two 16 B blocks from each of the two textures.

A 32 B cache line 804 that is generated by interleaving four textures can include 8 B blocks from each of the four textures. Further, a 32 B cache line 806 that is generated by interleaving three textures can include 8 B blocks from two of the three textures and a 16 B block from a remaining one of the three textures. In this case, the third texture that uses 16 B blocks can store twice the amount of data stored in the first two textures for the same number of pixels.

Four 16 B blocks cannot be interleaved to fit within a 32 B cache line. However, two 32 B cache lines 808 and 810 for a texture that is generated by interleaving four textures can each include two 16 B blocks from two of the four textures. Alternatively, a 64 B cache line can be used to store four 16 B blocks from a texture that is generated by interleaving four textures.

Figures 9A, 9B, 9C:
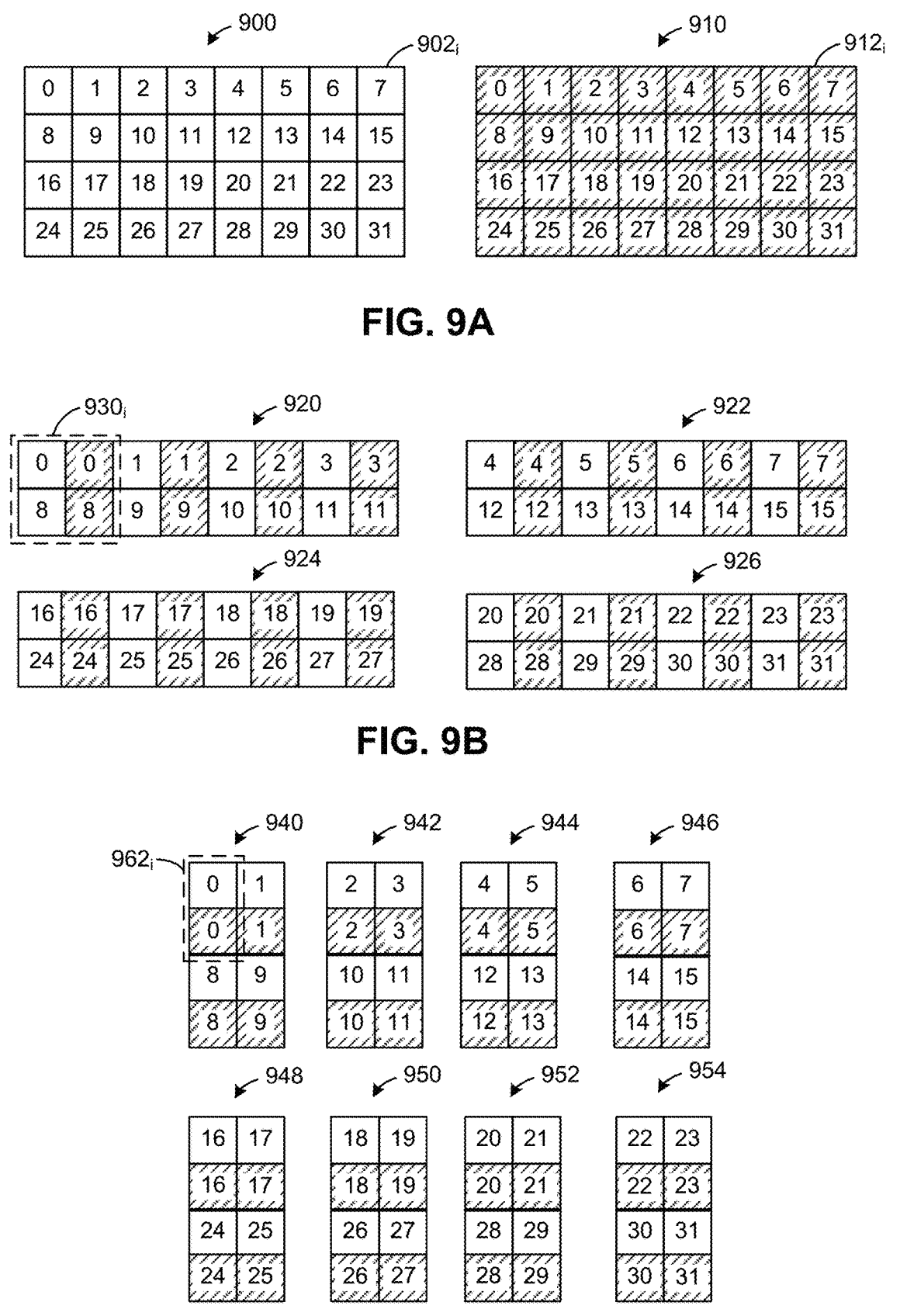

FIGS. 9A-C illustrates exemplar sectors and cache lines associated with an interleaved texture, according to various embodiments. FIG. 9A shows two textures 900 and 910 that include blocks 902 (referred to individually herein as a block 902 and collectively as blocks 902) and 912 (referred to individually herein as a block 912 and collectively as blocks 912), respectively. For example, the blocks 902 and 912 could be 4×4 blocks having a size of 8 B and including compressed texture data.

FIG. 9B shows an exemplar interleaving of the textures 900 and 910. FIGS. 9B-C assume that each cache line is 128B in size. In addition, FIG. 9B assumes that the textures 900 and 910 include 8B blocks. As shown, the interleaved texture can be divided into 32 B sectors 930$_i$ (referred to individually herein as a sector 930 and collectively as sectors 930) that each include four blocks. In addition, four sectors 930 can be included in each of four 128 B cache lines 920, 922, 924, and 926. For example, assume that 4×4 pixels are stored in 8B of each block 902 and 912. In such a case, a 32 B sector 930 can include 4×8 pixels from each of the textures 900 and 910, and each of the cache lines 920, 922, 924, and 926 can include 16×8 pixels from each of the textures 900 and 910. Because block 0 is on top of block 8, etc., the resolution is 4×8 pixels. In addition, four such pairs are stored in each cache line, resulting in 16×8 pixels total from each of the textures 900 and 910.

During rendering, a cache line can be allocated within texture cache 404 and one or more sectors in the cache line can be read from memory. Notably, each sector 930 includes blocks from both of the textures 900 and 910. Accordingly, a single cache line can be allocated, and sectors in that cache line that are required for texture sampling both textures 900 and 910 can be read from the interleaved texture, rather than allocating separate cache lines for each of the textures 900 and 910 and reading sectors from both of the textures 900 and 910.

As described, in some cases, such as when a bilinear lookup is being performed that requires texture data from multiple blocks that are in different cache lines, more than a single cache line may be allocated within the texture cache 404 and sectors in those cache lines read, even when interleaved textures are used. In some embodiments, in order to increase the cache hit rates when performing some texture filtering operations (e.g., bilinear lookups), pixel regions that are in each sector may have a square shape, such as the square sectors 930 shown in FIGS. 9B and 9C, or as close as possible to a square shape. The use of squares, or square-like shapes, provides a relatively equal probability of locality in the texture cache 404 regardless of the direction of traversal. More generally, any technically feasible layout of blocks, sectors, and/or cache lines may be used in embodiments. Note that in the sectors 930, each of the textures store 4×8 pixels per sector 930.

FIG. 9C shows another exemplar interleaving of textures. FIG. 9C assumes that the textures being interleaved include 16 B blocks. As shown, four 32 B sectors 962$_i$ (referred to individually herein as a sector 962 and collectively as sectors 962) that each include two blocks can be included in each of eight cache lines 940, 942, 944, 946, 948, 950, 952, and 954. For example, each 32 B sector 962 can include 4×4 pixels from each 16 B texture, and each cache line can include 8×8 pixels from each 16 B texture. Similar to the description above in conjunction with FIG. 9B, a cache line can be allocated for the interleaved texture and one or more of sectors in the cache line can be read from memory, rather than allocating separate cache lines for each of the 16 B textures and reading sectors from both of those textures.

It should be noted that interleaved blocks in the cache lines 940, 942, 944, 946, 948, 950, 952, and 954 are drawn as vertical neighbors rather than horizontal neighbors. Textures are generally addressed in terms of coordinates. In some embodiments, interleaved coordinates may be drawn with either horizontal neighbors or vertical neighbors (or even both, in the case of a 4-way interleaved texture), depending on artistic choice. Interleaved blocks that are drawn as vertical neighbors may be addressed using offset and scaling on the vertical coordinate rather than on the horizontal coordinate.

Figure 10:
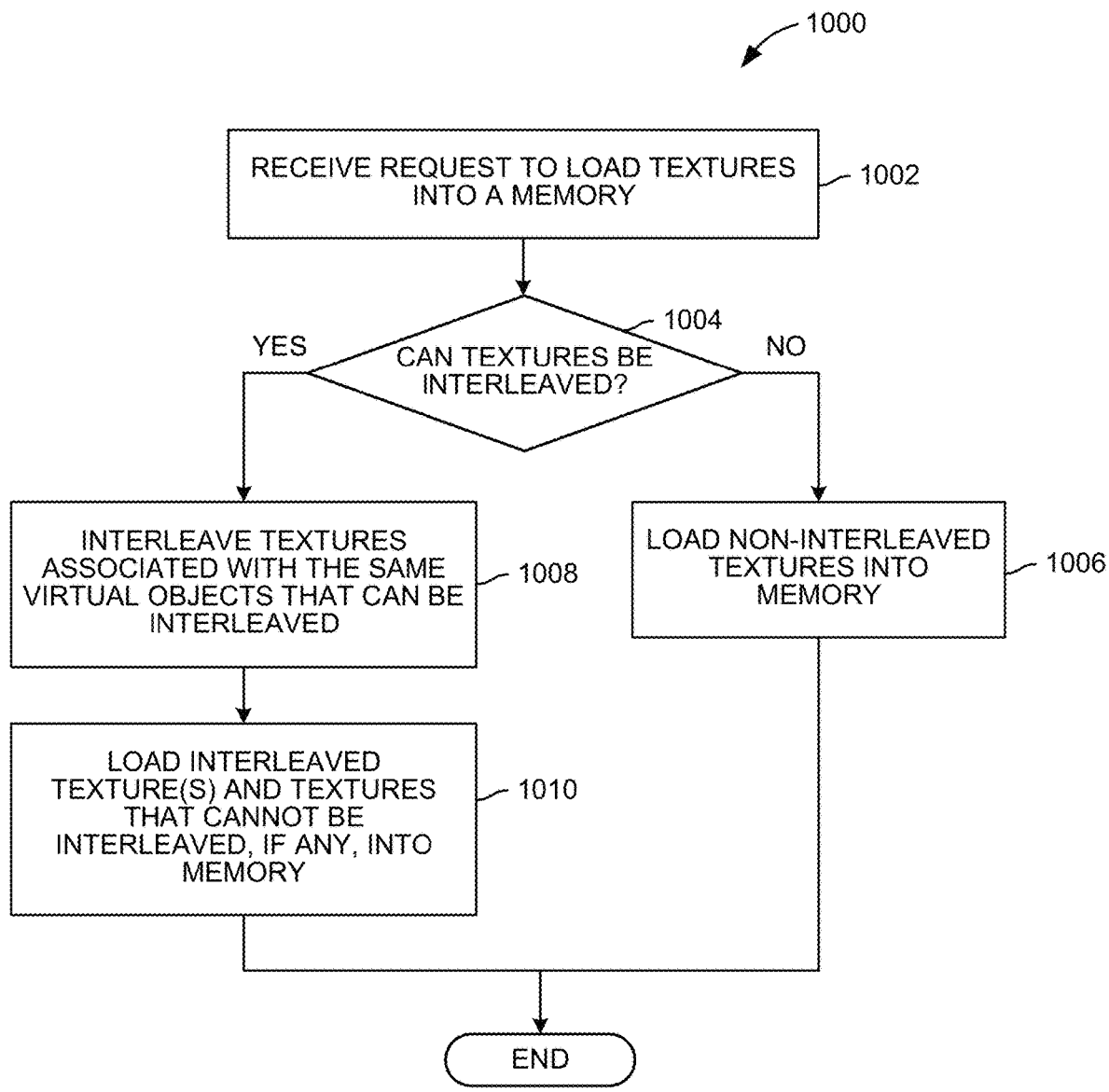
FIG. 10 is a flow diagram of method steps for generating an interleaved texture, according to various embodiments.

FIG. 10 is a flow diagram of method steps for generating an interleaved texture, according to various embodiments. Although the method steps are described in conjunction with the systems of FIGS. 1-5, persons skilled in the art will understand that any system configured to perform the method steps in any order falls within the scope of the present embodiments.

As shown, a method 1000 begins at step 1002, where the device driver 103 receives a request from the rendering application 130 to load textures into a memory, such as the PP Memory 204 described above in conjunction with FIGS. 3-4. For example, the rendering application could request to load textures into memory when the rendering application 130 is starting, when a new level in a game is being loaded that includes objects that are associated with textures, etc. Although FIG. 10 is described with respect to a request to load textures into memory, in other embodiments, interleaved textures may be generated prior to runtime based on, e.g., offline profiling of the rendering application 130. In yet other embodiments, the rendering application 130, or a user, may request that particular textures be interleaved via, e.g., an API.

At step 1004, the device driver 103 determines whether any of the textures being loaded into memory can be interleaved. In some embodiments, the device driver 103 profiles the rendering application 130 to determine whether interleaving can improve performance when textures are being accessed. For example, the device driver 103 could analyze code of the rendering application 130 to determine whether the rendering application 130 accesses multiple textures at the same texture coordinates, which occurs in some ray tracing techniques. More generally, interleaving textures can provide greater performance improvements when the textures are accessed concurrently at the same texture coordinates, and when those accesses are sparse. In some embodiments, the device driver 103 may determine whether textures can be interleaved based on whether the textures are accessed concurrently at the same texture coordinates and whether the accesses are sparse. In some embodiments, the device driver 103 further determines whether textures can be interleaved based on whether the textures have compatible formats and dimensions for interleaving, such as those described above in conjunction with FIGS. 6B and 9. In such cases, the device driver 103 may recognize candidate textures as having compatible formats and dimensions for interleaving based on those textures being associated with a same virtual object in some embodiments.

If the device driver 103 determines that no textures can be interleaved, then the method 1000 continues to step 1006, where the device driver 103 loads non-interleaved textures into memory. On the other hand, if the device driver 103 determines that one or more textures can be interleaved, then the method 1000 continues to step 1004, where the device driver 103 interleaves textures that are associated with the same virtual objects and can be interleaved. For example, the device driver 103 could interleave the base texture, specular map, normal map, and/or other textures that are associated with the same virtual objects and have compatible formats and dimensions for interleaving. More generally, an object can be associated with N textures, and the device driver 103 may determine that all or a subset of those textures can be interleaved. In some cases, of the N textures associated with an object, some textures (e.g., two textures) can be interleaved into one interleaved texture, while other textures (e.g., another two textures) can be interleaved into one or more other interleaved textures. In some embodiments, textures that are not associated with the same virtual object may also be interleaved in some cases. For example, textures having the same sizes (e.g., number of rows, columns, mip levels, etc.) and compatible formats, but associated with different virtual objects, could be interleaved. In some embodiments, each interleaved texture that is generated includes alternating blocks from multiple textures being interleaved. Examples of various interleaving formats are described above in conjunction with FIG. 8.

At step 1006, the device driver 103 loads the interleaved texture(s) and textures that cannot be interleaved, if any, into the memory (e.g., the PP Memory 204 described above in conjunction with FIGS. 3-4).

Figure 11:
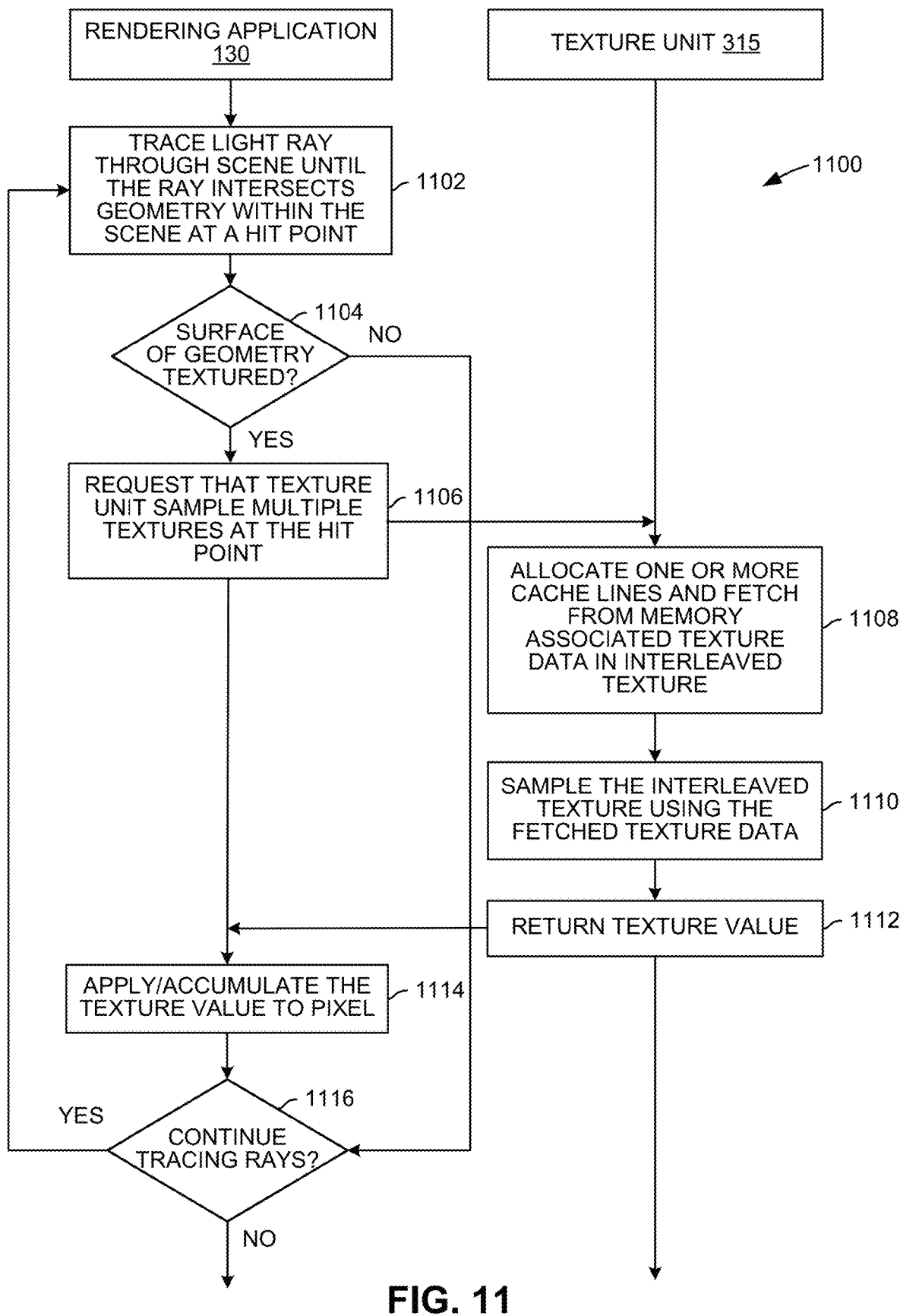
FIG. 11 is a flow diagram of method steps for performing ray tracing using one or more interleaved textures, according to various embodiments.

FIG. 11 is a flow diagram of method steps for performing ray tracing using one or more interleaved textures, according to various embodiments. Although the method steps are described in conjunction with the systems of FIGS. 1-5, persons skilled in the art will understand that any system configured to perform the method steps in any order falls within the scope of the present embodiments. Although described with respect to tracing a single ray, the method steps can be repeated to trace multiple rays when rendering an image.

As shown, a method 1100 begins at step 1102, where the rendering application 130 traces a light ray through a scene until the ray intersects geometry within the scene at a hit point. In particular, the ray can be traced through a pixel in a screen space into the scene until the ray intersects a triangle in the geometry at the hit point.

At step 1104, if the surface of the geometry at the hit point is textured, then, at step 1106, the rendering application 130 requests that the texture unit 315 sample multiple textures at the hit point. In some embodiments, sampling the textures can include retrieving texture data from those textures. In some embodiments, sampling the textures further includes performing texture filtering operations, such as bilinear lookups. The rendering application 130 may request that the texture unit 315 sample multiple textures when interleaved textures are opaque to the rendering application 130. For example, the rendering application 130 could request that multiple textures associated with corresponding texture headers (e.g., the texture headers 650 and 660) be sampled at particular texture coordinates. In other embodiments, interleaved textures may be exposed to the rendering application 130, rather than being opaque to the rendering application 130. In such cases, the rendering application 130 may request that the texture unit sample an interleaved texture at the hit point.

At step 1108, the texture unit 315 allocates one or more cache lines and fetches, from a memory, texture data in an interleaved texture that is associated with the one or more cache lines. For example, the texture unit 316 could allocate a single cache line in a texture cache (e.g., texture cache 404) and fetch, from a memory, one or more sectors in the cache line that include texture data required for texture sampling. The memory can be a PP memory (e.g., PP memory 204) or another cache (e.g., L2 cache 406). Although described with respect to a single interleaved texture, steps 1108-1110 can be repeated if the object that the light ray hits is associated with multiple interleaved textures (and/or similar steps can be performed for one or more non-interleaved textures), as described above in conjunction with FIG. 10.

At step 1110, the texture unit 315 samples the interleaved texture at the hit point using the texture data that is fetched from memory. In some embodiments, sampling the interleaved texture includes sampling different textures in the interleaved texture based on corresponding texture headers, as described above in conjunction with FIG. 6. In other embodiments, sampling the interleaved texture includes sampling different textures in the interleaved texture based on a single texture header.

At step 1112, the texture unit 315 returns, to the rendering application 130, a texture value. The texture value represents a texture color associated with the pixel in the screen space through which the light ray was traced at step 1102.

At step 1114, the rendering application 130 applies or accumulates the texture value to the pixel through which the light ray was traced at step 1102. The applied or accumulated texture value contributes to the color of the pixel in a rendered image. As described, the rendered image can be, e.g., an image or frame within a video game or film, or the like. Although described herein with respect to applying or accumulating the texture value to the pixel, in other embodiments, the texture value may be used in any technically feasible manner.

At step 1116, if the rendering application 130 determines not to continue tracing light rays, then the method 1100 ends, and the rendering application 130 can perform other operations. On the other hand, if the rendering application 130 determines to continue tracing light rays, then the method 1100 returns to step 1102, where the rendering application 130 traces another light ray through the scene, until the other light ray intersects geometry within the scene again at another hit point. For example, the rendering application 130 could determine to continue tracing rays if the surface of the geometry that the light way intersected at step 1102 is reflective, or if the geometry is associated with a diffuse material.

Although described herein primarily with respect to two-dimensional (2D) textures, techniques disclosed herein may also be applied to interleave layers of an array-of-2D textures or 3D textures. In such cases, pixels may be grouped in cubes or cube-like shapes, rather than the squares and square-like shapes described above in conjunction with FIG. 9.

Although described herein primarily with respect to compressed textures, techniques disclosed herein may also be applied to non-compressed textures. For example, if a non-compressed texture stores each pixel using 4 B (one byte per component), then 2×2 pixels from two non-compressed textures can be interleaved in a 32 B sector.

Although described herein primarily with respect to ray tracing, techniques disclosed herein may also be applied to generate interleaved textures that are used by applications that do not perform ray tracing. In such cases, the multiple textures in an interleaved texture may sometimes be accessed separately, rather than identically and contemporaneously.

Although described herein primarily with respect to reading from interleaved textures, techniques disclosed herein may also be applied to generate interleaved textures that can be written to.

In sum, in the disclosed techniques, multiple textures that would otherwise be accessed separately during ray tracing are interleaved into a single, interleaved texture that can be used to access the multiple textures together. For workloads where identical coordinates are fetched from multiple textures, especially in incoherent patterns, fewer cache lines can be allocated within a cache, and less texture data can be read from memory, for the interleaved texture relative to the multiple textures. In some embodiments, an interleaved texture includes alternating blocks from multiple textures. In some embodiments, a device driver generates an interleaved texture when multiple textures are being loaded into memory. In some embodiments, an interleaved texture can be accessed using multiple texture headers that are associated with different textures in the interleaved texture. In such cases, each of the multiple texture headers includes a stride that indicates a distance between two blocks from the same texture in the interleaved texture. In other embodiments, the interleaved texture may be accessed using a single texture header.

At least one technological advantage of the disclosed techniques relative to the prior art is that, oftentimes, the disclosed techniques can allocate a single cache line for an interleaved texture and read associated texture data, rather than allocating a separate cache line for each of a number of textures, such as multiple textures associated with a virtual object that a light ray being traced through a virtual scene intersects, and reading texture data associated with those cache lines. Accordingly, texture bandwidth usage can be reduced, and computational performance can be improved. In addition, the disclosed techniques can be implemented with multiple texture headers that make the interleaved texture opaque to software applications and users. These technological advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowcharts and block diagrams in the figures illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering one or more graphics images, the method comprising:
generating an interleaved texture from a plurality of textures, wherein a first texture in the plurality of textures includes a plurality of first blocks of texture data, a second texture in the plurality of textures includes a plurality of second blocks of texture data that are different from the plurality of first blocks of texture data, and the interleaved texture includes the plurality of first blocks and the plurality of second blocks in alternating positions within the interleaved texture; and
rendering one or more graphics images based on the interleaved texture.

2. The computer-implemented method of claim 1, wherein rendering the one or more graphics images comprises allocating a cache line and reading texture data associated with the cache line from the interleaved texture, and wherein the texture data associated with the cache line comprises texture data from the plurality of textures.

3. The computer-implemented method of claim 1, wherein rendering the one or more graphics images comprises accessing the interleaved texture in a memory based on a plurality of texture headers, and wherein each texture header included in the plurality of texture headers corresponds to a respective texture included in the plurality of textures.

4. The computer-implemented method of claim 3, wherein each texture header included in the plurality of texture headers comprises a starting address that indicates a first block of one of the plurality of textures and a stride that indicates a distance between two blocks from a same texture in the interleaved texture.

5. The computer-implemented method of claim 1, wherein rendering the one or more graphics images comprises accessing the interleaved texture in a memory based on a texture header associated with the interleaved texture.

6. The computer-implemented method of claim 1, wherein rendering the one or more graphics images comprises performing one or more ray tracing operations.

7. The computer-implemented method of claim 1, further comprising determining whether to generate the interleaved texture based on profiling an application.

8. The computer-implemented method of claim 1, wherein the plurality of textures comprises at least one of a base texture, a specular texture, or a normal map.

9. One or more non-transitory computer-readable media storing program instructions that, when executed by at least one processor, cause the at least one processor to perform the steps of:
generating an interleaved texture from a plurality of textures, wherein a first texture in the plurality of textures includes a plurality of first blocks of texture data, a second texture in the plurality of textures includes a plurality of second blocks of texture data that are different from the plurality of first blocks of texture data, and the interleaved texture includes the plurality of first blocks and the plurality of second blocks in alternating positions within the interleaved texture; and
rendering one or more graphics images based on the interleaved texture.

10. The one or more non-transitory computer-readable media of claim 9, wherein rendering the one or more graphics images comprises allocating a cache line and reading texture data associated with the cache line from the interleaved texture, and wherein the texture data associated with the cache line comprises texture data from the plurality of textures.

11. The one or more non-transitory computer-readable media of claim 9, wherein rendering the one or more graphics images comprises accessing the interleaved texture in a memory based on a plurality of texture headers, and wherein each texture header included in the plurality of texture headers corresponds to a respective texture included in the plurality of textures.

12. The one or more non-transitory computer-readable media of claim 9, wherein rendering the one or more graphics images comprises accessing the interleaved texture in a memory based on a texture header associated with the interleaved texture.

13. The one or more non-transitory computer-readable media of claim 9, further comprising determining whether to generate the interleaved texture based on profiling an application.

14. The one or more non-transitory computer-readable media of claim 9, further comprising determining whether to generate the interleaved texture based on whether the plurality of textures are accessed concurrently at the same texture coordinates.

15. The one or more non-transitory computer-readable media of claim 9, further comprising determining whether to generate the interleaved texture based on whether accesses of the plurality of textures are sparse.

16. The one or more non-transitory computer-readable media of claim 9, wherein the steps of generating the interleaved texture and rendering the one or more graphics images are performed in a cloud computing environment.

17. A system, comprising:
one or more memories storing instructions; and
one or more processors that are coupled to the one or more memories and, when executing the instructions, are configured to:
generate an interleaved texture from a plurality of textures, wherein a first texture in the plurality of textures includes a plurality of first blocks of texture data, a second texture in the plurality of textures includes a plurality of second blocks of texture data that are different from the plurality of first blocks of texture data, and the interleaved texture includes the plurality of first blocks and the plurality of second blocks in alternating positions within the interleaved texture, and
render one or more graphics images based on the interleaved texture.

* * * * *